United States Patent [19]

Miyamoto et al.

[11] Patent Number: 5,986,037
[45] Date of Patent: Nov. 16, 1999

[54] POLYCARBONATE RESIN WITH A REDUCED VOLATILE CHLORINE CONTENT AND PROCESS FOR PRODUCING THE SAME

[75] Inventors: Masaaki Miyamoto; Kenji Tsuruhara; Tadashi Nishimura, all of Kitakyushu, Japan

[73] Assignee: Mitsubishi Chemical Corporation, Tokyo-To, Japan

[21] Appl. No.: 08/987,608

[22] Filed: Dec. 9, 1997

[30] Foreign Application Priority Data

Dec. 9, 1996 [JP] Japan ..................................... 8-328331

[51] Int. Cl.⁶ .................................................... C08G 64/00

[52] U.S. Cl. ........................................... 528/198; 528/196

[58] Field of Search ...................................... 528/196, 198

[56] References Cited

U.S. PATENT DOCUMENTS 3,895,045  7/1975  Firth, Jr. .................................... 528/196

*Primary Examiner*—Terressa Mosley
*Attorney, Agent, or Firm*—Oblon, Spivak, McClelland, Maier & Neustadt, P.C.

[57] ABSTRACT

There is provided a polycarbonate resin with a reduced volatile chlorine content in which the amount of a chlorinous matter as volatilized from the resin when the resin is heated at 280° C. for 30 minutes and then allowed to stand at room temperature for 3 days is 30 ppb or lower as calculated in terms of the amount of Cl atom. There is also provided a process for producing a polycarbonate resin using phosgene as a raw material, the improvement comprising using phosgene having a chlorine concentration of up to 1,000 ppb as the raw material thereby to provide the resin with a reduced volatile chlorine content.

18 Claims, No Drawings

POLYCARBONATE RESIN WITH A REDUCED VOLATILE CHLORINE CONTENT AND PROCESS FOR PRODUCING THE SAME

BACKGROUND OF THE INVENTION

1. Field of the Invention

This invention relates generally to a polycarbonate resin with a reduced volatile chlorine content and a method of producing such a polycarbonate resin, and more particularly to a polycarbonate resin which, upon held at normal temperatures, volatilizes a reduced amount of a chlorinous matter and so has stable quality, and a process for producing such a polycarbonate resin.

2. Background Art

Polycarbonate resins are generally produced by a two-phase interface polycondensation process wherein an aqueous solution of an alkali metal salt of diphenol, e.g., bisphenol A is reacted with phosgene in the presence of an organic solvent, or by a melt polycondensation process wherein the same reaction takes place in the absence of an organic solvent. So far, many studies have been made of impurities contained in phosgene used as the starting material in these processes.

Among them there are techniques for reducing the amount of chlorine contained in phosgene from the order of several hundred ppm to the order of a few tens ppm.

For instance, U.S. Pat. Nos. 3,230,253 and 3,331,873 disclose a method of treating phosgene with phenols or activated carbon (active carbon) for adsorption and removal of chlorine contained as an impurity in the phosgene. However, these patents are silent as to the use of such a chlorine-reduced phosgene as a raw material for polycarbonate production.

On the other hand, Japanese Patent Laid-Open Publication Nos. 62-297320 and 62-297321 teach that phosgene contains as an impurity carbon tetrachloride having a higher boiling point than that of phosgene, and that when a polycarbonate resin is produced using phosgene as a raw material, the carbon tetrachloride remaining in the polycarbonate resin causes generation of hydrogen chloride during molding of the resin due to the heat applied. For this reason, these publications propose reducing the amount of carbon tetrachloride in phosgene to a certain low level.

The publications, however, teach nothing about the phenomenon of gradual volatilization of a chlorinous matter from the resin when it is allowed to stand at normal temperatures after molding.

Phosgene is generally produced by the reaction of CO with $Cl_2$ using an activated carbon as a catalyst. This reaction arrives at equilibrium at its final stage. To reduce the amount of $Cl_2$ to be contained in the resulting phosgene, therefore, the $CO/Cl_2$ ratio is to be shifted in such a direction that CO becomes excessive. The use of a large excess of CO, however, leads not only to CO gas loss but also to an unacceptable increase in the amount of the phosgene inevitably discharged as an off-gas together with the CO gas, whereby the production cost is undesirably increased.

Accordingly, in the practical operation in most of phosgene plants, the excessive amount of CO is usually reduced to the limit at which phosgene loss is minimized. Consequently, phosgene products now available usually contain a certain level of $Cl_2$.

It was discovered by the present inventors that the presence of chlorine in the starting phosgene for the production of a polycarbonate resin correlates with the gradual volatilization of a chlorinous matter from a molded product of the polycarbonate resin.

Thus, it has been found that the chlorine present in the starting phosgene causes some form of chlorination at a certain site of raw materials at an initial reaction stage in the preparation process of polycarbonate, and the thus formed chlorinated portion remains unchanged throughout the preparation process. The chlorinated portion still remains unchanged even during a molding process of the resulting polycarbonate; however, it may be gradually decomposed with time at normal temperatures to cause gradual volatilization of a chlorinous matter from the molded product (this a chlorinous matter can be detected as Cl ion).

On the other hand, when such carbon tetrachloride as mentioned above remains in polycabonate or when there are chloroformate group residues that are formed in the production process of a polycarbonate resin by the two-phase interface polycondensation technique, the generation of HCl is observed during the melt molding of the resin. However, these chlorinated groups must be clearly distinguished from the aforesaid chlorinated portion in starting materials produced by $Cl_2$ in the starting phosgene.

In this regard, it is to be noted that the above chlorinated groups of very high reactivity change to HCl immediately upon the application thereto of heat on melt molding, and the HCl can be easily removed by washing the molded product with pure water.

In the case of the chlorinated portion in raw materials produced by $Cl_2$ present in the starting phosgene, on the other hand, it can partly be decomposed due to the heat in the melt molding of a polycarbonate resin to generate and emit a chlorinous matter. However, most of the chlorinated portions remain unchanged through the molding. The remaining chlorinated portions are kept unchanged when the molded product is washed with pure water, but may gradually be decomposed by the action of light or the like to volatilize a chlorinous matter (detectable as Cl ion). Such chlorine is herein called "volatile chlorine".

The presence of such volatile chlorine has in fact been neglected, but now is found to cause various problems in connection with the quality or physical properties of a variety of recently developed molded articles of polycarbonate resins.

An object of the present invention is to provide a polycarbonate resin having a reduced volatile chlorine content, and a process of producing the same.

SUMMARY OF THE INVENTION

The inventors have accomplished the present invention based on the finding that as the amount of chlorine contained as an impurity in the starting phosgene for the production of a polycarbonate resin is reduced as small as possible, there is a decrease in the amount of chlorine volatilizing gradually from a molded product of the resin when it is allowed to stand at normal temperatures.

The amount of molecular chlorine contained in phosgene has been determined in terms of an absorbance at 330 nm wavelength, as disclosed in U.S. Pat. Nos. 3,230,253 and 3,331,873, with the lower limit of detection being 10 ppm. Thus, for the detection of the content of the molecular chlorine at 10 ppm or lower, no accurate analysis means has been available.

In this regard, the inventors have found that when a large amount (at least 70 grams) of $COCl_2$ containing a trace amount (lower than 10 ppm) of $Cl_2$ as an impurity is absorbed in an aqueous solution of NaOH, only $Cl_2$ changes to NaClO, and redox titration of the system can successfully detect the trace amount of chlorine.

According to one aspect of the present invention, there is thus provided a polycarbonate resin with a reduced volatile chlorine content in which the amount of a chlorinous matter as volatilized from the resin when the resin is heated at 280° C. for 30 minutes and then allowed to stand at room temperature for 3 days is 30 ppb or lower as calculated in terms of the amount of Cl atom.

According to another aspect of the present invention, there is provided in a process for producing a polycarbonate resin using phosgene as a raw material, the improvement comprising using phosgene having a chlorine concentration of up to 1,000 ppb as the raw material thereby to provide the resin with a reduced volatile chlorine content.

DETAILED DESCRIPTION OF THE INVENTION

[I] Preparation of Polycarbonate Resin with a Reduced Volatile Chlorine Content (1) General Description The process for producing a polycarbonate resin with a reduced volatile chlorine content according to the present invention may be carried out by any known method using phosgene as a raw material. The wording "using phosgene as a raw material" used herein is not limited to the case of using phosgene as a direct raw material for the resin, but includes the case of preparing an intermediate product of the resin using phosgene as a raw material and using the intermediate product for the production of the intended resin.

Known processes for producing polycarbonate resins generally involve the reaction of a diphenol with a starting carbonate material, wherein phosgene or a carbonate material of phosgene origin is used as the starting carbonate material.

Examples of such processes include:

1) process wherein phosgene is reacted with a diphenol under interface polycondensation or solution polycondensation conditions,
2) process wherein a diaryl carbonate such as diphenyl carbonate is prepared by the reaction of phosgene with a monohydroxy aromatic compound such as phenol, and the diacryl carbonate is then allowed to react with a diphenol under melt polycondensation conditions, and
3) process wherein a dialkyl carbonate such as dimethyl carbonate is prepared by the reaction of phosgene with a monohydric alcohol such as methanol, and the dialkyl carbonate is then subjected to an ester exchange reaction with a monohydroxy aromatic compound such as phenol to prepare a diaryl carbonate such as diphenyl carbonate, and this diaryl carbonate is finally allowed to react with a diphenol under melt polycondensation conditions.

(2) Raw Materials (a) Phosgene

The phosgene to be used in the process for producing a carbonate resin according to the present invention may be in a liquid or gaseous state. In the practice of the present invention, it is important that the raw material phosgene used has a $Cl_2$ concentration of up to 1,000 ppb, preferably up to 500 ppb, more preferably up to 100 ppb, and most preferably 0 to 100 ppb.

The starting phosgene is generally produced by the reaction between carbon monoxide and chlorine, and hence contains a considerable amount of chlorine.

Reduction of the content of $Cl_2$ in the starting phosgene to the above ranges may be achieved by any desired method, for instance, by the adsorption and removal of $Cl_2$ using an adsorbent such as an activated carbon or by the separation and removal of $Cl_2$ by distillation making use of a boiling point difference. Of these methods, the former method of using an adsorbent is preferred.

As an adsorbent usable in the present invention, in addition to the activated carbon, adsorbents containing metals such as mercury and antimony, zeolite adsorbents, alumina adsorbents, etc. may be used, provided that they can reduce the amount of chlorine in phosgene to the aforesaid quantitative range.

These adsorbents preferably have a small particle size, generally 2-mesh undersize, preferably 8-mesh undersize, more preferably 16-mesh undersize, and most preferably 32-mesh undersize.

Too small a particle size, however, may offer some operational problems. The lower limit of particle size is generally about 60-mesh oversize. A preferable particle size is 8-mesh undersize to 60-mesh oversize.

For the activated carbon use may be made of activated carbon for acid gas, activated carbon for basic gas, and activated carbon for general-purpose gas, among which preference is given to the activated carbon for acid gas, which has the following physical properties:

True density: 1.9 to 2.2 g/cc

Porosity: 33 to 55%

Specific surface area: 700 to 1,500 $m^2/g$

Pore volume: 0.5 to 1.1 cc/g

Average pore diameter: 12 to 40 Å

From the viewpoint of temperature control, the starting phosgene is preferably in a liquid state, and this is true especially for the removal of $Cl_2$ by the adsorption treatment with an adsorbent.

When a liquid phosgene is used for the reaction, the reaction pressure should be controlled so that the phosgene is kept in a liquid state at varying reaction temperatures.

The adsorption treatment for removal of $Cl_2$ in phosgene may be carried out in various manners. For instance, a liquid phosgene may be passed through an activated carbon-containing tower at a superficial velocity (SV) of 2 to 20, preferably 5 to 20 and at a temperature of generally up to 5° C., for instance, 0.5° C.

(b) Diphenol

The diphenol usable in the process of the present invention preferably has a general formula HO—Z—OH, wherein Z is one or more aromatic nuclei with the proviso that the hydrogen atoms bonded to the carbon atoms in the nuclei may be substituted with chlorine, bromine, an aliphatic group or an alicyclic group. Plural aromatic nuclei may respectively have different substituents, or may be bonded together by a crosslinking group which may be an aliphatic group, an alicyclic group, a hereto atom or a combination thereof.

Examples of such diphenols include hydroquinone, resorcin, dihydroxydiphenol, bis(hydroxyphenyl)alkane, bis (hydroxyphenyl)cyclolalkane, bis(hydroxyphenyl) sulfide, bis(hydroxyphenyl) ether, bis(hydroxyphenyl) ketone, bis (hydroxyphenyl)sulfone, bis(hydroxyphenyl) sulfoxide, and bis(hydroxyphenyl)dialkylbenzene, and their derivatives having an alkyl or halogen substituent on their nuclei. These diphenols may be used in combination of two or more.

These diphenols as well as other suitable diphenols are disclosed, for example, in U.S. Pat. Nos. 4,982,014, 3,028, 365, 2,999,835, 3,148,172, 3,275,601, 2,991,273, 3,271,367, 3,062,781, 2,970,131 and 2,999,846, German Patent Laid-Open Publication Nos. 1,570,703, 2,063,050, 2,063,052 and 2,211,956, and French Patent No. 1,561,518.

Particularly preferred diphenols include 2,2-bis(4-hydroxyphenyl)-propane, 2,2-bis(3,5-dimethyl-4-hydroxyphenyl)-propane, 1,1-bis(4-hydroxyphenyl) cyclohexane, and 1,1-bis(4-hydroxyphenyl)-3,3,5-trimethylcyclohexane, with 2,2-bis(4-hydroxyphenyl) propane (bisphenol A) being most preferred.

(c) Additives

In the production of polycarbonate resins according to the present invention, a chain stopper and/or a branching agent may be added, if required.

Chain Stopper

Suitable chain stoppers include various monophenols, for instance, normal phenol and $C_1$ to $C_{10}$ alkyl phenols such as p-t-butylphenol and p-cresol, and halogenated phenols such as p-chlorophenol, and 2,4,6-tribromophenol, among which phenol, cumylphenol, isooctylphenol, and p-t-butylphenol are preferred.

The amount of chain stopper used is generally 0.5 to 10% by weight based on the amount of diphenol in an aqueous phase, although it varies depending on the molecular weight of the final product.

Branching Agent

The branching agent usable in the present invention may be selected from various compounds having three or more functional groups. Suitable branching agents include compounds having three or more phenolic hydroxyl groups, for instance, 2,4-bis(4-hydroxyphenylisopropyl) phenol, 2,6-bis (2'-hydroxy-5'-methylbenzyl)-4-methylphenol, 2-(4-hydroxyphenyl)-2-(2,4-hydroxyphenyl)-propane, and 1,4-bis(4,4'-dihydroxytriphenylmethyl)-benzene. Use may also be made of compounds having three or more functional groups, for instance, 2,4-dihydroxybenzoic acid, trimesic acid, cyanuric chloride, bis(4-hydroxy-phenyl)-2-oxo-2,3-dihydroxyindole, and 3,3-bis(4-hydroxy-3-methylphenyl)-2-oxo-2,3-dihydroxyindole. Preferred are the compounds having three or more phenolic hydroxy groups. The amount of the branching agent used is generally 0.05 to 2 mol % based on the amount of diphenol in an aqueous phase, although it varies depending upon the intended branching degree.

(3) Polycondensation Reaction (a) Reaction conditions

As previously noted, typical known processes for producing poly-carbonate resins using phosgene as a starting material include:

1) process wherein phosgene is reacted with a diphenol under interface polycondensation or solution polycondensation conditions,
2) process wherein a diaryl carbonate such as diphenyl carbonate is prepared by the reaction of phosgene with a monohydroxy aromatic compound such as phenol, and the diacryl carbonate is then allowed to react with a diphenol under melt polycondensation conditions, and
3) process wherein a dialkyl carbonate such as dimethyl carbonate is prepared by the reaction of phosgene with a monohydric alcohol such as methanol, and the dialkyl carbonate is then subjected to an ester exchange reaction with a monohydroxy aromatic compound such as phenol to prepare a diaryl carbonate such as diphenyl carbonate, and this diaryl carbonate is finally allowed to react with a diphenol under melt polycondensation conditions.

A more detailed explanation will be given below of the interface polycondensation process that is now the most typical production process.

Interface Polycondensation Process

According to this process, generally, a diphenols is reacted with phosgene in the presence of water and an organic solvent. Usually, an alkali metal salt of diphenol in an aqueous phase is allowed to react with phosgene in the presence of an organic solvent. The thus obtained polycarbonate oligomer is usually subjected to an additional polycondensation reaction, thereby obtaining a high-molecular weight polymer.

<Solvent>

The organic phase used herein should contain an inert organic solvent which can dissolve phosgene, and the reaction products including a carbonate oligomer, and polycarbonate under the reaction temperature and pressure employed, but does not dissolve water (in such a sense that it does not form a solution with water).

Typical inert organic solvents include an aliphatic hydrocarbon such as hexane and n-heptane; a halogenated aliphatic hydrocarbon such as methylene chloride, chloroform, carbon tetrachloride, dichloroethane, trichloroethane, tetrachloroethane, dichloropropane and 1,2-dichloroethylene; an aromatic hydrocarbon such as benzene, toluene and xylene; a halogenated aromatic hydrocarbon such as chlorobenzene, o-dichlorobenzene and chlorotoluene; and a substituted aromatic hydrocarbon such as nitrobenzene and acetophenone, among which a halogenated hydrocarbon such as methylene chloride or chlorobenzene is most preferred.

These inert organic solvents may be used alone or in admixture with other solvents.

It is to be noted that when chlorobenzene is used alone, it is required to employ a high operation temperature in the reaction and in a later washing step in order to obtain a useful concentration of polycarbonate in chlorobenzene.

For the production of a polycarbonate using as a starting material 2,2-bis(4-hydroxyphenyl)propane, which is an industrially important polycarbonate, a mixed solvent of methylene chloride and toluene is preferably used.

Preferably, the aqueous phase should contain at least three components, water, diphenol and an alkali metal hydroxide. In the aqueous phase, the diphenol reacts with the alkali metal hydroxide, for instance, sodium hydroxide or potassium hydroxide to yield a water-soluble alkali metal salt. It is preferable that the aforesaid three components are mixed together to prepare a homogeneous aqueous solution prior to coming into contact with the organic phase. If required, however, a part or all of these three components may be mixed at the time of coming into contact with the organic phase.

<Quantitative Ratio>

The molar ratio between the diphenol and the alkali metal hydroxide in the aqueous phase is preferably 1:1.8 to 1:3.5, and more preferably 1:2.0 to 1:3.2. When such an aqueous solution is prepared, the temperature thereof should preferably be at least 20° C., especially 30 to 40° C. Too high a temperature incurs the oxidation of the diphenol. It is thus preferable that the aqueous solution be prepared at the minimum required temperature and desirably in a nitrogen atmosphere or with the addition of a small amount of a reducing agent such as hydrosulfite.

The preferred amount of phosgene used herein is generally 1 to 2 moles, especially 1.05 to 1.5 moles per mole of diphenol, although it varies depending on the reaction conditions, especially the reaction temperature and the concentration of the alkali metal salt of diphenol in the aqueous phase. Too high a ratio will remarkably lower the production yield because of an increase in the amount of unreacted phosgene. At too low a ratio, on the other hand, no proper extension of molecular weight is achievable for shortage of CO groups.

(b) Catalyst

In the practice of the present invention, a polycondensation catalyst is supplied at the time of contact of the aqueous phase with the organic phase prior to contact with phosgene.

If desired, however, the polycondensation catalyst can be supplied at the time of contact with phosgene.

The polycondensation catalyst may be selected from many polycondensation catalysts known to be usable for the two-phase interface polycondensation processes. Preferred catalysts are trialkylamine, N-ethylpyrrolidone, N-ethylpiperidine, N-ethylmorpholine, N-isopropylpiperidine, and N-isopropyl-morpholine, with triethylamine and N-ethylpiperidine being most preferred.

(c) Preparation of Oligomer

At the oligomer-forming stage, the concentration of oligomer in the organic phase may be in such a range that the formed oligomer can be fully dissolved therein, more specifically, generally in the range of about 10 to 40% by weight. The proportion of the organic phase is preferably in the range of 0.2 to 1.0 by volume with respect to the aqueous solution of the alkali metal salt of diphenol, i.e., the aqueous phase.

The reaction temperature is generally up to 80° C., preferably up to 60° C., and more preferably 10 to 50° C. At too high a reaction temperature it is difficult to control side reactions, and at too low a reaction temperature there is an increase in the load on a refrigerant carrier.

The viscosity-average molecular weight (Mv) of the oligomer obtained under the above polycondensation conditions is generally in the range of about 500 to 10,000, and preferably 1,600 to 4,500 although not limited thereto.

(d) Polycondensation Reaction

The thus obtained oligomer is usually converted to a high-molecular polycarbonate under conventional polycondensation conditions. In a preferable embodiment of the present invention, the organic phase with the oligomer dissolved therein is separated from the aqueous phase. If required, an additional amount of the aforesaid inert organic solvent is added to the organic phase to regulate the concentration of the oligomer.

More specifically, the amount of the solvent is so regulated that the concentration of the resulting polycarbonate in the organic phase comes in the range of 5 to 30% by weight. Thereafter, a fresh aqueous phase containing water and an alkali metal hydroxide is added to the organic phase. To the resultant system is preferably added, the aforesaid polycondensation catalyst. The system is then brought under two-phase interface polycondensation conditions to prepare the intended polycarbonate. The volume ratio of the organic phase to the aqueous phase during the polycondensation is preferably about 1:0.2–1.

After the completion of polycondensation, the reaction product is washed with an alkali such as NaOH so that the amount of the remaining chloroformate group is reduced to 0.01 $\mu$eq/g or lower. Thereafter, the organic phase is washed until no electrolyte is found, and the inert organic solvent is removed form the organic phase, and then the polycarbonate product is finally separated therefrom.

[II] Polycarbonate Resin

The viscosity-average molecular weight (Mv) of the thus obtained polycarbonate is generally in the range of about 10,000 to 100,000, and preferably about 12,000 to 35,000.

It is here noted the viscosity-average molecular weight (Mv) can be calculated from the following equations (1) and (2):

$$\eta sp/C=[\eta](1+0.28 \eta sp) \quad (1)$$

$$[\eta]=1.23\times10^{-5}Mv^{0.83} \quad (2)$$

where C is a predetermined concentration (0.6 g/dl) of oligomer or polycarbonate in a methyl chloride solution, and $\eta sp$ is the specific viscosity of the solution as measured at a temperature of 20° C. With respect to the thus obtained polycarbonate, the amount of a chlorinous matter as generated and volatilized from a molded product thereof, as calculated in terms of the amount of Cl atom and as determined by the below-described method, can be reduced to up to 30 ppb (per polymer), preferably up to 20 ppb, and more preferably about 1 to 20 ppb. Thus, the polymer has an additional advantage of being less susceptible to discoloration upon molding.

Effective amounts of various additives such as stabilizers, release agents, flame retardants, antistatics, fillers, fibers, and impact strength modifiers may be added to the polycarbonate resin when it is separated from the reactor, or prior to or during its processing.

[III] Use

The polycarbonate obtained according to the present invention may be processed into various molded articles by injection molding, extrusion molding or the like, for instance, into films, threads, and sheets. Furthermore, the present polycarbonate may be used in a variety of application fields, for instance, as materials for electric parts, illumination equipments and optical equipments, lamp housings, optical lenses, audio disks, etc. The present polycarbonate is especially useful for containers for electric or electronic parts because such parts often dislike the volatile chlorine present in the containers.

Further, the present polycarbonate is markedly improved in thermal stability upon molding so that it is less susceptible to a hue change upon melt molding, providing a less-colored molded article. Accordingly, the molded articles can find a wider range of applications.

EXAMPLES

The present invention will now be explained more specifically with reference to the following examples. It is to be understood that the examples illustrate the present invention but are not intended to limit it.

Preparation of Phosgene

A liquefied phosgene was passed at −5° C., 7.2 kg/hour and SV (Superficial velocity)=4 through a cylindrical tower having a diameter of 5 mm and a height of 500 mm and filled with an activated carbon for acidic gas (Shirasagi GH2X4/6UG made by Takeda) having the following physical properties.

The above treatment was carried out repeatedly until the content of $Cl_2$ in the liquefied phosgene as measured at the outlet of the tower was reduced to 0 ppb.

To the thus obtained chlorine-free phosgene was added $Cl_2$ gas in such an amount as to adjust the $Cl_2$ content in phosgene to those reported in Table 1 in the row headed "before treatment with activated carbon".

The thus obtained $Cl_2$-containing phosgene was passed once through the above activated carbon-containing tower so as to reduce the $Cl_2$ content in phosgene to those reported in Table 1 in the row headed "after treatment with activated carbon".

Physical Properties of Activated Carbon for Acidic Gas

Particle size: 4-mesh undersize to 6-mesh oversize

Degree of vacuum: 2.1 g/cc

Porosity: 40%

Specific surface area: 1,200 m$^2$/g

Pore volume: 0.86 cc/g

Average pore diameter: 12 Å

Examples 1–5

Bisphenol A (BPA) (15.09 kg/hour) and sodium hydroxide (NaOH) (5.49 kg/hour) were dissolved at 35° C. in water (93.5 kg/hour) in the presence of hydrosulfite (0.017 kg/hour). Thereafter, the aqueous phase cooled down to 25° C., and an organic phase of methylene chloride (61.9 kg/hour) cooled down to 5° C. were respectively supplied through a Teflon line of 6 mm in inner diameter and 8 mm in outer diameter to a Teflon pipe reactor of 6 mm in inner diameter and 35 meters in length. In the reactor, these phases were brought into contact with separately supplied phosgene (7.2 kg/hour) that was cooled to 0° C. and had the $Cl_2$ content reported in Table 1.

The above raw material (the solution of bisphenol A and sodium hydroxide) was passed together with phosgene through the pipe reactor at a linear speed of 1.7 m/sec. for 20 seconds for carrying out oligomerization. At this time, the reaction temperature reached 60° C. at the end of the reactor in the adiabatic system. The reaction product was regulated by external cooling to 35° C. prior to entering the next oligomerization tank described below. For the next oligomerization, a catalyst triethylamine (0.005 kg/hour) and a molecular weight modifier p-t-butylphenol (0.39 kg/hour) were respectively introduced into the oligomerization tank.

The thus oligomerized emulsion, obtained from the pipe reactor, was then guided into a reactor of 50-liter inner volume provided with a stirrer, in which the emulsion was agitated at 30° C. in an $N_2$ atmosphere to conduct a further oligomerization, whereby an unreacted sodium salt of bisphenol A (BPA-Na) remaining in the aqueous phase was completely consumed. Thereafter, the aqueous and oil phases were allowed to stand for separation into their individual phases, thereby obtaining a methylene chloride solution of oligomer.

23 kg of the above methylene chloride solution of oligomer was charged in a 70-liter reactor with a Faudler blade. 10 kg of methylene chloride for diluting purposes was added to the reactor together with 2.2 kg of a 25 wt % aqueous solution of NaOH, 6 kg of water and 2.2 g of triethylamine, and polycondensation reaction was conducted under agitation at 30° C. for 60 minutes in a nitrogen ($N_2$) gas atmosphere to obtain a polycarbonate.

To the resultant reaction liquid was added 30 kg of methylene chloride and 7 kg of water. After stirring the liquid for 20 minutes, it was allowed to stand for separation into the aqueous phase and the organic phase. To the separated organic phase was added 20 kg of 0.1 N hydrochloric acid and the system was stirred for 15 minutes, so that triethylamine and a small amount of alkali component residues were extracted from the organic phase, whereupon stirring was stopped for the separation of the system into the aqueous phase and the organic phase. To the separated organic phase was added 20 kg of pure water and the system was stirred for 15 minutes, whereupon stirring was stopped for the separation of the system into the aqueous phase and the organic phase. This operation was repeated (three times) until any chlorine ion was not detected in water discharges from extraction.

The thus obtained purified polycarbonate solution was fed into warm water at 40° C. for size reduction to granular size, followed by drying to obtain granulars (flakes). The flakes were found to have a nitrogen content of 1.5 ppm.

For the determination of the content of chlorine in phosgene, 70 g of the above-described liquefied phosgene was vaporized, and absorbed in an NaOH solution. Then, the resulting NaClO was subjected to redox titration, thereby determining the amount of chlorine.

The average molecular weight of the oligomer, the average molecular weight of the flakes, and the color tone of molded products were measured by the methods described later. The results are shown in Table 1.

Example 6

The procedures of the preceding Examples were followed except that as the separately introduced liquefied phosgene cooled to 0° C., use was made of phosgene that had passed at –5° C. and 7.2 kg/hour through the same cylindrical tower as described above but containing a different activated carbon (Yashicoal M made by Taihei Kagaku) having the following physical properties:

Particle size: 8-mesh undersize to 30-mesh oversize
Degree of vacuum: 2.0 to 2.2 g/cc
Porosity: 33 to 45%
Specific surface area: 700 to 1,500 $m^2/g$
Average pore diameter: 12 to 40 Å

Measurements of the physical properties reported in Table 1 were conducted by the following methods.

(1) Molecular Weight Distribution (Mw/Mn)

A GPC (gel permeation chromatography) apparatus (HLC-8020 made by Toso Co., Ltd.) was used along with an eluting solution tetrahydrofuran (THF). A sample was isolated into fractions in four columns packed with four high-speed GPC fillers (TSK 5000HLX, 4000HLX, 3000HLX and 2000HLX made by Toso Co., Ltd.) to detect refractive index differences for chart plotting. From the chart was determined Mw and Mn on polystyrene basis.

(2) Color Tone (YI)

Preparation of Sample Plate

Flakes were plasticized at 28° C. using an injection molding machine (FS80S-12ASE manufactured by Nissei Jushi Kogyo Co., Ltd.), and then held in its cylinder for 15 seconds to form a square sample plate, 3.2-mm thickness and 60-mm width. Another sample plate was prepared by holding flakes in the cylinder for 5 minutes after plasticization.

Measurement of Color Tone

These sample plates were measured for their color tone (YI value) using a color difference meter (SM-4-CH manufactured by Suga Shikenki Seisakusho Co., Ltd.). A small YI value for the 15-second residence sample indicates a good color tone for a normal molded product, and a small YI value difference (ΔYI) between the 15-second residence and the 5-minute residence samples indicates a good thermal stability.

(3) Measurement of Volatile Chlorine

A flake sample was heated to 280° C. for 30 minutes in the following manner, and then held at room temperature for 3 days to measure the amount of a chlorinous vapor generated.

Thus, flakes were extruded at 290° C. in a 30-mm twin-screw extruder (manufactured by Ikegai Tekko Co., Ltd.), and then pelletized.

The obtained pellets (10 g) were charged in a glass pipe of an inner diameter of 10 mm which had been fully washed with water treated by ion-exchange chromatography, and then the glass pipe was heat-sealed in vacuo (the length of the sealed glass pipe was 20 cm). The sealed glass pipe was fully immersed upright in an oil bath at 280° C. for 30 minutes. Thereafter the pipe was cooled, and washed to clear the glass pipe of externally deposited oil, etc. Subsequently, the glass pipe was held as such at room temperature for 3 days.

A portion of the glass pipe just above the polymer charged portion was cut out, and the inside of the pipe portion cut out was washed with 1 ml of pure water. The wash water was collected and analyzed by ion-exchange chromatography, thereby determining the amount of chlorinous matter volatilized per gram of polymer.

In the above operations, great care was taken to prevent accidental entrance of chlorine from the hands and sweat of the operator, and $H_2O$ used for cooling into the flakes and the pellets.

TABLE 1

|  |  | Example 1 | Example 2 | Example 3 | Example 4 | Example 5 | Example 6 |
|---|---|---|---|---|---|---|---|
| Content of $Cl_2$ in phosgene (ppb) | Before treatment with activated carbon | 10,000 | 5,000 | 1,000 | 500 | 500 | 10,000 |
|  | After treatment with activated carbon | 1,000 | 500 | 100 | not detected | not detected | not detected |
| Molecular weight of oligomer (Mv) |  | 2,000 | 2,100 | 1,900 | 1,800 | 1,700 | 2,000 |
| Average molecular weight of polymer (Mv) |  | 21,000 | 21,100 | 20,900 | 21,300 | 21,400 | 21,000 |
| Molecular weight distribution (Mw/Mn) |  | 2.83 | 2.84 | 2.86 | 2.80 | 2.82 | 2.83 |
| Color tone | 15-sec residence | 2.1 | 1.9 | 1.8 | 1.1 | 1.0 | 1.0 |
|  | 5-min residence | 3.5 | 3.0 | 2.9 | 1.8 | 1.8 | 1.7 |
|  | ΔYI | 1.4 | 1.1 | 1.1 | 0.7 | 0.8 | 0.7 |
| Amount of chlorinous matter volatilized (ppb per polymer) |  | 20 | 18 | 15 | 8 | 7 | 5 |

Comparative Examples 1–3

The procedure of Example 1 was repeated except that the starting phosgenes having the $Cl_2$ contents shown in Table 2 were used.

TABLE 2

|  |  | Comp. Example 1 | Comp. Example 2 | Comp. Example 3 |
|---|---|---|---|---|
| Content of $Cl_2$ in phosgene (ppb) | Before treatment with activated carbon | 10,000 | 2,000 | 5,000 |
|  | After treatment with activated carbon | No treatment with activated carbon | | |
| Molecular weight of oligomer (Mv) |  | 1,850 | 2,100 | 2,000 |
| Average molecular weight of polymer (Mv) |  | 21,000 | 20,800 | 21,200 |
| Molecular weight distribution (Mw/Mn) |  | 2.82 | 2.84 | 2.85 |
| Color tone | 15-sec residence | 4.5 | 3.5 | 3.9 |
|  | 5-min residence | 8.0 | 6.5 | 7.0 |
|  | ΔYI | 3.5 | 3.0 | 3.1 |
| Amount of chlorinous matter volatilized (ppb per polymer) |  | 80 | 50 | 75 |

What is claimed is:

1. A polycarbonate resin prepared with phosgene, in which the amount of a chlorinous matter as volatilized from the resin when the resin is heated at 280° C. for 30 minutes and then allowed to stand at room temperature for 3 days is 30 ppb or lower as calculated in terms of the amount of Cl atom.

2. The polycarbonate resin according to claim 1, wherein the amount of the chlorinous matter is 20 ppb or lower.

3. The polycarbonate resin according to claim 2, wherein the amount of the chlorinous matter is 1 to 20 ppb.

4. The polycarbonate resin according to claim 1, which has a viscosity-average molecular weight of 10,000 to 100,000.

5. In a process for producing a polycarbonate resin using phosgene as a raw material, the improvement comprising using phosgene having a chlorine concentration of up to 1,000 ppb as the raw material thereby to provide the resin with a reduced volatile chlorine content.

6. The process according to claim 5, wherein the starting phosgene has a chlorine concentration of up to 500 ppb.

7. The process according to claim 6, wherein the starting phosgene has a chlorine concentration of up to 100 ppb.

8. The process according to claim 5, which comprises the step of allowing phosgene or a carbonate raw material as prepared by using phosgene as a raw material to react with a diphenol.

9. The process according to claim 8, wherein the diphenol is 2,2-bis(4-hydroxyphenyl)propane.

10. The process according to claim 8, wherein the reaction is conducted in the presence of an organic solvent.

11. The process according to claim 10, wherein the diphenol is in the form of an alkali metal salt.

12. The process according to claim 10, wherein the organic solvent is a halogenated hydrocarbon.

13. The process according to claim 12, wherein the halogenated hydrocarbon is methylene chloride.

14. The process according to claim 8, which comprises the steps of reacting a diphenol with phosgene in the presence of water and an organic solvent to prepare a polycarbonate oligomer, and then subjecting the polycarbonate oligomer to polycondensation reaction, thereby obtaining a polycarbonate resin.

15. The process according to claim 8, wherein a diaryl carbonate obtained by reacting phosgene with a monohydroxy aromatic compound is used as the carbonate raw material.

16. The process according to claim 5, wherein phosgene as obtained by the reaction of carbon monoxide with chlorine is used as the starting phosgene.

17. The process according to claim 16, wherein the starting phosgene has been subjected to an adsorption treatment with an adsorbent.

18. A process of claim 17, wherein the adsorbent is an activated carbon.

* * * * *